July 12, 1960
W. E. HARRIS
2,944,617
DIFFERENTIAL MOUNTING FOR A MOTOR VEHICLE
Filed July 29, 1959
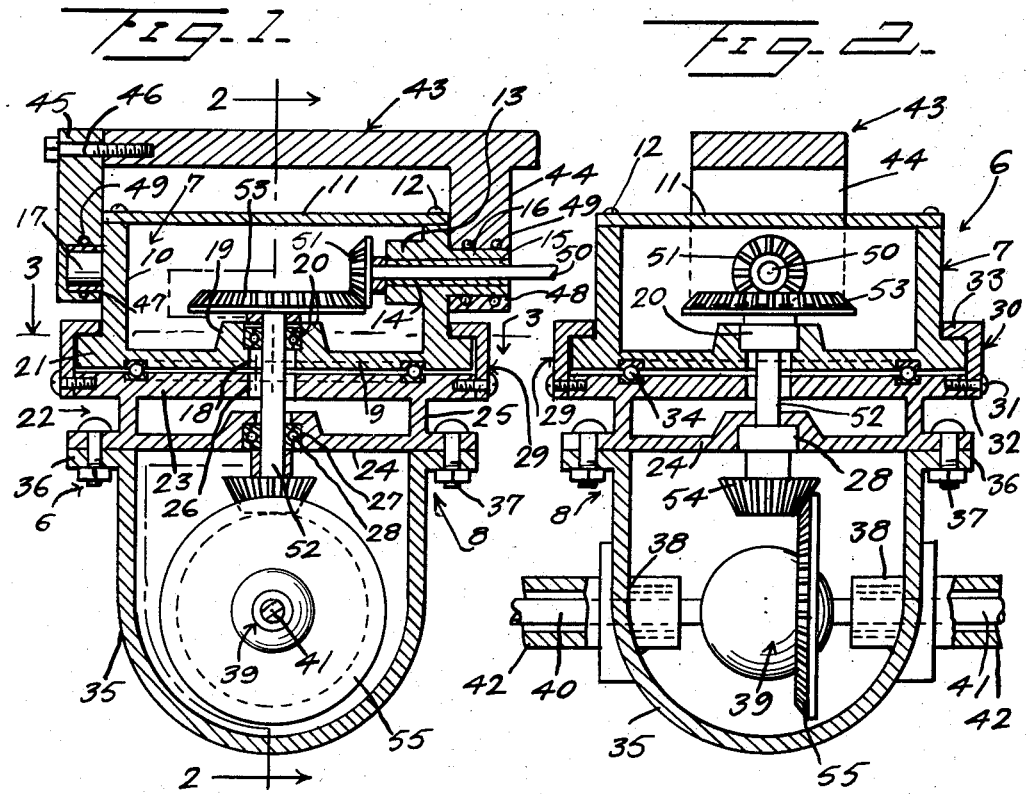
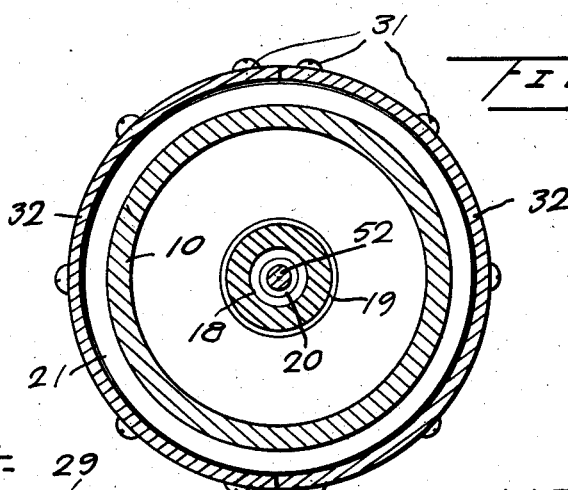
INVENTOR
W.E. HARRIS
BY John N. Randolph
ATTORNEY United States Patent Office 2,944,617
Patented July 12, 1960

2,944,617
DIFFERENTIAL MOUNTING FOR A MOTOR VEHICLE
William E. Harris, 3245 Park Ave., Paducah, Ky.
Filed July 29, 1959, Ser. No. 830,262
1 Claim. (Cl. 180—42)

This invention relates to a novel housing or support for a motor vehicle differential gearing and more particularly to a mounting employed with a differential utilized for driving the front wheels of a vehicle and which permits steering of said front wheels and also an up and down movement of the front wheels relative to the vehicle chassis or frame.

More particularly, the present invention involves a novel construction of housing for a motor vehicle differential gearing including an upper housing section which is mounted for rocking movement in a vehicle frame or chassis about a horizontal axis disposed longitudinally or axially of the vehicle frame or chassis, and a lower housing section which is swivelly connected to the upper housing section for oscillating movement about an axis disposed perpendicular to the axis of rocking movement of the housing.

Various other objects and advantages of the invention will hereinafter become more fully apparent from the following description of the drawing, illustrating a presently preferred embodiment thereof, and wherein:

Figure 1 is a vertical sectional view through the differential mounting and through an end portion of a vehicle frame or chassis, in a direction longitudinally of the chassis or frame;

Figure 2 is a vertical sectional view, partly broken away, taken substantially along a plane as indicated by the line 2—2 of Figure 1, and in a direction crosswise of the vehicle chassis or frame;

Figure 3 is a horizontal sectional view through the differential housing, taken substantially along a plane as indicated by the line 3—3 of Figure 1, and Figure 4 is an exploded view, partly in side elevation and partly in section, showing two elements of the differential housing.

Referring more specifically to the drawing, the differential housing in its entirety and comprising the invention is designated generally 6 and includes an upper housing section 7 and a lower housing section 8.

The upper housing section 7 includes a bottom 9, a surrounding side wall 10 and a top wall 11. The top wall 11 may be detachably fastened to the upper edge of the side wall 10 by fastenings 12, or other suitable means may be provided to afford access to the interior of said upper housing section 7. A part of the side wall 10 is provided with an internal boss 13 and a bore 14 extends through said boss and through the wall 10. An inner end of a bushing 15 lines said bore 14 and the outer end of the bushing 15 provides a lining for the bore of a trunnion 16, which is preferably formed integral with and extends outwardly from a part of the wall 10. The wall 10 is provided with a second trunnion 17 extending outwardly therefrom and disposed opposite to the trunnion 16. The bottom 9 has a central opening 18 and an annular internal boss 19 surrounding said opening and which contains antifriction bearing means 20. The bottom 9 is provided with a peripheral portion 21 forming an annular flange and which extends outwardly beyond the periphery of the cylindrical side wall 10.

The lower housing section 8 includes an upper portion 22 having a top wall 23 and a bottom wall 24 which are connected together in spaced apart relation by a cylindrical side wall 25 of smaller diameter than the walls 23 and 24. The upper wall 23 has a central opening 26 to align with the opening 18 and the lower wall 24 has a centrally disposed flanged opening 27 containing antifriction bearing means 28. Said upper portion 22 of the lower housing section 8 also includes an annular flange 29 of angular cross section and preferably composed of two corresponding semicylindrical halves 30 which fit snugly around the periphery of the upper wall 23 and are detachably secured thereto by fastenings 31. Each of said flange sections 30 includes a semicylindrical wall 32 the bottom portion of which engages around a part of the periphery of the wall 23 and has the fastenings 31 extending therethrough. The upper edge of the semicylindrical wall 32 terminates in an inturned lip 33 which is disposed above and spaced from the wall 23 and which engages over a part of the annular flange 21 and fits loosely around a part of the cylindrical wall 10. Thus, the annular flange 29 cooperates with the annular flange 21 for swivelly connecting the housing sections 7 and 8 to one another about an axis disposed crosswise of the axis of the trunnions 16 and 17. When the housing sections are thus assembled, as illustrated in Figures 1 and 2, a slight clearance exists between the adjacent faces of the walls 9 and 23 and antifriction bearing means 34 are preferably provided between said opposed faces. The lower portion 35 of the lower housing section 8 may be bowl shaped, as shown in Figures 1 and 2, and is provided with an outturned annular flange 36 at its top which bears against the underside of the peripheral portion of the lower wall 24 and is connected thereto by fastenings 37. The lower part of the bottom housing portion 35 is provided with aligned bearings 38 which extend therethrough.

A conventional differential gearing 39 is contained within the housing portion 35 and is connected to the adjacent ends of two aligned axles 40 and 41, which are disposed in axle housings 42 and have adjacently disposed portions journaled in the bearings 38. Remote ends of the axles 40 and 41, not shown, are fixed to the front wheels, not shown, of a vehicle which are to be driven through the differential 39 and which may be steered by any suitable mechanism, not shown, capable of causing the lower housing section 8 to swivel relative to the upper housing section 7.

The forward end portion 43 of the vehicle chassis or frame is illustrated in Figures 1 and 2 including longitudinally spaced depending vertical walls 44 and 45. The front wall 45, constituting the forwardmost end of the chassis portion 43, is detachably mounted by fastenings 46. The lower portion of said wall 45 is provided with a rearwardly opening socket 47 in which the trunnion 17 is journaled and the wall 44 has a bore 48 extending therethrough and which aligns with the socket 47 and provides a journal for the trunnion 16. The socket 47 and bore 48 are provided with suitable antifriction bearing means 49. A drive shaft 50, driven by the vehicle engine, not shown, has a forward portion journaled in the bushing 15 and a forward end disposed within the housing section 7 and to which a beveled pinion 51 is fixed. A shaft 52 extends through the openings 18, 26 and 27 and is journaled in the antifriction bearings 20 and 28. A bevel gear 53 is fixed to the upper end of the shaft 52 and is disposed within the upper housing section 7 and meshes with the pinion 51. A bevel pinion 54 is fixed to the lower end of the shaft 52 and is disposed within the housing portion 35 and meshes with a bevel gear 55 which is also contained within the housing portion 35 and which forms a part of the differential gearing 39. Thus, rotation of the drive shaft 50 causes the differential gearing 39 to be driven for driving the axles 40 and 41 at the same speeds or at different speeds, as is conventional.

The differential mounting 6 is primarily adapted for use for the front wheels of a tractor, bulldozer or similar motor vehicle and provides a means whereby the front wheels can be driven without interference with the steering thereof, due to the fact that the lower housing section 8 can swivel about the axis of the shaft 52, so that the two front axles 40 and 41 are capable of swinging forwardly and rearwardly. Likewise, the differential housing or mounting 6 is capable of rocking about the horizontal axis 16, 17 which is disposed at a right angle to the axis about which the lower housing section 8 swivels and which axis 16, 17 is disposed longitudinally of the vehicle chassis or frame. Thus, the lower housing section 8 rocks about said longitudinal axis 16, 17 and swivels about an axis which is disposed perpendicular to the axis of rocking movement. The axis 16, 17 permits a rocking movement of the housing 6 to enable an up and down swinging movement of the axles 40 and 41 and an up and down movement of the front wheels, not shown, which are driven by said axles.

The rear wheels, not shown, of the vehicle may be driven by a differential mounted in a conventional manner or by a differential having a mounting similar to the mounting 6 except that said mounting is not capable of rocking about a horizontal axis.

It will be understood that the forward chassis portion 43 is supported by the upper housing section 7 which, in turn, is supported by the lower housing section 8 and the antifriction bearings 34 interposed between said housing sections, while the lower housing section 8 is supported by the axles 40 and 41 and their axle housings 42.

Various modifications and changes are contemplated and may be resorted to, without departing from the function or scope of the invention as hereinafter defined by the appended claim.

I claim as my invention:

In combination with a vehicle chassis portion having longitudinally spaced journal means; a differential housing including an upper housing section provided with outwardly projecting trunnions engaging in said journal means and swingably mounting said upper housing section in said chassis portion for swinging movement about a substantially horizontal axis disposed longitudinally of the chassis portion, a lower housing section including a bottom portion having an open top and a top portion detachably secured to said bottom portion and closing the open top thereof, said top portion including spaced substantially parallel walls having aligned openings, said upper housing section defining an upper chamber of the differential housing and including a bottom wall having an outwardly projecting surrounding annular flange, connecting members of angular cross section detachably secured to said top portion and engaging around said annular flange for detachably and swivelly connecting the lower housing section to the upper housing section for swivel movement of the lower housing section relative to the upper housing section about an axis disposed crosswise of the axis of said journal means, antifriction bearing means interposed between said bottom wall and one of the walls of said top portion, disposed adjacent said bottom wall, said bottom wall having an opening aligning with the openings of said walls of the top portion, a shaft extending through and journaled in said wall openings and disposed to coincide with the swivel axis of the differential housing, one of said trunnions being tubular to provide a bearing, a drive shaft having a portion journaled in said trunnion bearing and extending into the chamber of the upper housing section, meshing bevel gears contained within said chamber of the upper housing section and secured to adjacent ends of the first mentioned shaft and said drive shaft, said lower housing section defining a lower chamber of the differential housing, disposed beneath the top portion thereof, into which the other end of said first mentioned shaft extends, a differential contained in said lower chamber, the axis of said differential being disposed perpendicular to the axis of said first mentioned shaft, said bottom portion having bearings aligning with the axis of said differential, axles connected to said differential and extending through and journaled in said last mentioned bearings, and a bevel gear disposed within said bottom chamber and secured to said first mentioned shaft and meshing with a bevel gear of the differential.

References Cited in the file of this patent

UNITED STATES PATENTS

| | | |
|---|---|---|
| 1,405,159 | Polaski et al. | Jan. 31, 1922 |
| 1,447,073 | Gore | Feb. 27, 1923 |